Dec. 26, 1939.   A. G. H. STRAATMAN ET AL   2,184,931
ORIENTING DEVICE
Filed April 5, 1938   2 Sheets—Sheet 1

Inventors:
A. G. H. Straatman
and D. P. Rees

Dec. 26, 1939.  A. G. H. STRAATMAN ET AL  2,184,931
ORIENTING DEVICE
Filed April 5, 1938   2 Sheets—Sheet 2

Inventors:
A.G.H. Straatman
and D.P. Rees

Patented Dec. 26, 1939

2,184,931

UNITED STATES PATENT OFFICE 2,184,931

ORIENTING DEVICE

Alphons Gerard Hubert Straatman, The Hague, Netherlands, and Douglas Percy Rees, Birmingham, England, assignors to Shell Development Company, San Francisco, Calif., a corporation of Delaware Application April 5, 1938, Serial No. 200,190
In the Netherlands April 13, 1937

3 Claims. (Cl. 255—1)

This invention pertains to an apparatus for the orientation of various bodies, tools or devices located in boreholes deviating from the vertical.

In determining the oriented position within boreholes of such devices as whipstocks, knuckle-joints, core barrels, etc., the orientation does not necessarily have to be effected with regard to the points of the compass. Very often, it is only necessary to ascertain the position of the deviation plane of the borehole, that is, of the vertical plane passing through the axis of the deviating borehole, with regard, for example, to the symmetry plane of the whipstock, or to a plane passing through a definite mark on a core barrel. In the case of whipstocks or knuckle-joints, any desired directional change in drilling may thereupon be effected by a suitable adjustment in the angle between the deviation plane of the borehole and the symmetry plane of the whipstock or of the knuckle-joint. Similarly, in orienting cores or core-barrels, once the position of the core with regard to the deviation plane of the borehole is recorded, and the azimuth and the amount of dip of the borehole is determined by additional measurements according to well known methods, a complete orientation of the core may be effected on withdrawing said core from the well.

In United States Letters Patent No. 1,806,509 and No. 2,109,853, devices have already been described whereby the position of a whipstock, core drill or other tool in the borehole can be oriented in the manner defined above. These devices have, however, the drawback of requiring their withdrawal from the borehole whenever the desired readings are to be taken.

It is therefore the object of the present invention to provide a clinometer or orienting device capable of indicating the relative position of a body located within a borehole with regard to the deviation plane of said borehole, and of electrically transmitting said indication to the surface, whereby the necessity of raising said device to the surface for the purpose of taking readings is avoided, and orienting operations are considerably simplified and expedited.

The clinometer of the present invention comprises a housing attached in fixed relationship to the body or tool to be oriented, or to the pipe string supporting said tool within a deviating borehole, a plurality of electrical contacts within said housing, and a movable member free to move to its lowermost position within said housing under the action of the gravitational force, said movable member and said contacts cooperating to close an electric circuit adapted to transmit to the surface an indication of the angular relationship in a horizontal plane between the tool to be oriented and the deviation plane of the well.

The present invention will be understood from the following description taken with reference to the attached drawings, wherein.

Figure 1:
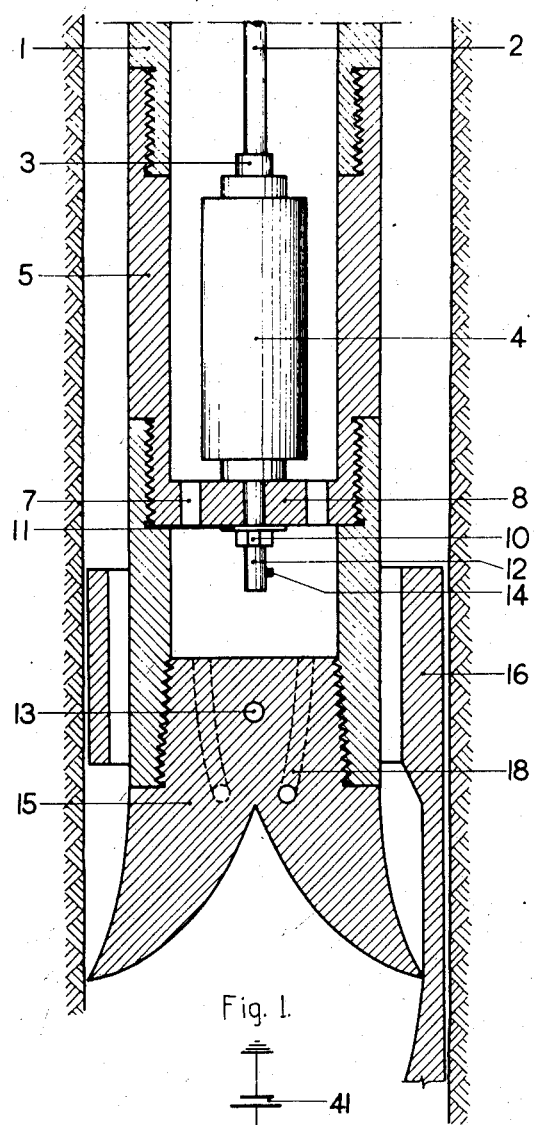
Fig. 1 is a schematic cross-section view showing the method of attaching the present orienting device to a pipe string supporting a drill bit and a whipstock.

Referring to Fig. 1, a drill bit 15, having passages 18 for the circulation of mudflush, is shown attached to the end of a drill string 1. An adapter or intermediate piece 5, provided with a spider 8, is interposed between the lower end of the drill string and the drill bit. A whipstock 16 is attached to the bit by means of a breakable shear bolt 13.

The spider 8 is provided with openings 7 for the circulation of mudflush, and supports the housing 4 of the present clinometer or orienting device. The housing 4 is electrically connected to the surface by means of an insulated detachable contact piece 3 and an insulated cable 2 carrying electrical conductors.

The lower end of housing 4 carries a boltlike member 12, projecting through an axial opening of the spider 8 and fixedly secured thereto by means of a washer 11 and nut 10. A pin 14 may be used to set by rotation the housing 4 in any desired angular relationship in a horizontal plane with regard, for example, to the symmetry plane of the whipstock.

Figure 2:
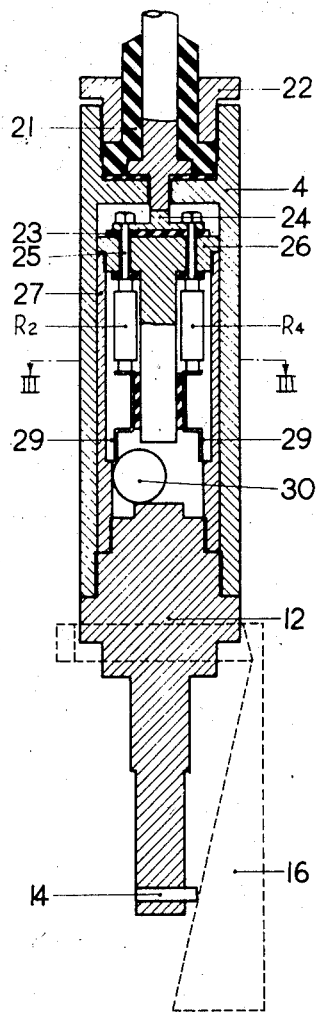
Fig. 2 is a longitudinal cross-section view of an embodiment of the present clinometer or orienting device wherein a free-rolling ball is used as the movable member.

Fig. 2 gives a longitudinal cross-section view of the orienting device which comprises a metallic tubular housing 4, closed at the top by a plug 22, provided with a suitable opening for the contact piece and cable 2 and the insulating cap 21. The bottom of the housing 4 is closed by means of a plug provided with the boltlike projection 12.

A metallic cylinder 27 is inserted within casing 4 and is closed at the top by a screw-lid 26. Bolts 25 pass through lid 26 and are insulated therefrom and electrically connected to cable 2 through a contact plate 24. Insulation between plate 24 and lid 26 is provided by means of gasket 23.

Figure 3:
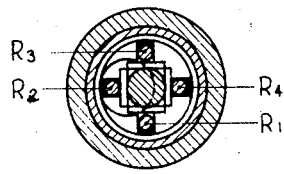
Fig. 3 is a cross-section view taken along line III—III of Fig. 2.

The bolts 25 support and are electrically connected with resistors $R_2$ and $R_4$ and also with resistors $R_1$ and $R_3$, not shown in Fig. 2, and therethrough with metallic strips or contacts 29. Each of the resistors $R_1$, $R_2$, $R_3$ and $R_4$ has a different resistance value, and any number of these resistors and of contacts may be used, four being shown in Fig. 3.

Figure 4:
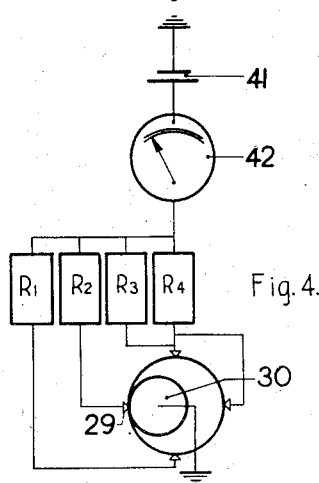
Fig. 4 is a wiring diagram of the electrical circuit used in operating the device of Fig. 1.

A polished metallic ball 30 is arranged to roll freely within the housing 4, being supported by the lower plug 12 and the inner wall of the polished wall of cylinder 27. The ball 30 is of sufficient diameter to permit it to contact the strips 29, whereby an electric circuit comprising the grounded housing 4, the ball 30, one of the contacts 29, one of the resistors, one of the bolts 25, contact plate 24, cable 2, an indicating device 42, a source of E. M. F. 41, and the ground is established, as shown in Fig. 4.

In orienting a whipstock by means of the present device, the drill bit 15 is lowered into a deviating borehole at the end of a drill string, together with the whipstock 16 and the orienting device 4. The position of the housing 4 is adjusted, by means of the pin 14 in any desired manner, for example, so that the plane of symmetry of the whipstock 16 passes through the center line of the contact strips attached to resistors $R_2$ and $R_4$, the body of the whipstock lying, for example, to the same side from the axis of the apparatus as resistor $R_4$, as schematically shown in dotted lines in Fig. 2. If the object of the whipstocking operation, for example, is to bring a deviating borehole back to vertical, the drill string is rotated, within the borehole, until the reading of the indicating device 42 shows that the electric circuit is closed by ball 30 through the contact strip 29 attached to resistor $R_2$. Since the center of gravity of ball 30 tends to occupy the lowermost position within housing 4, which position always lies in the deviation plane of the well, this reading indicates that the deviation plane of the well passes through resistors $R_2$ and $R_4$. Since the symmetry plane of the whipstock had also been adjusted to lie in said plane in the manner described above, this reading indicates therefore that the whipstock is properly placed for bringing the well back to vertical. Pressure is then applied to the drill string, whereby the shear bolt 13 is broken, and drilling is resumed, the drill bit 15 and whipstock 16 cooperating to straighten the borehole.

It is, of course understood, that the plane of symmetry of the whipstock is not necessarily placed so as to coincide with the plane passing through resistors $R_2$ and $R_4$, but may be placed in any other desired and known angular relationship with regard thereto, the indications given by the meter 42 at the surface being, as explained above, sufficient for a correct determination of the position of the symmetry plane of the whipstock with regard to the deviation plane of the borehole.

Figs. 5–8 show a somewhat different embodiment of the present device, wherein the movable member comprises one or more pendulums free to oscillate at right angles to each other.

Figures 5, 6:
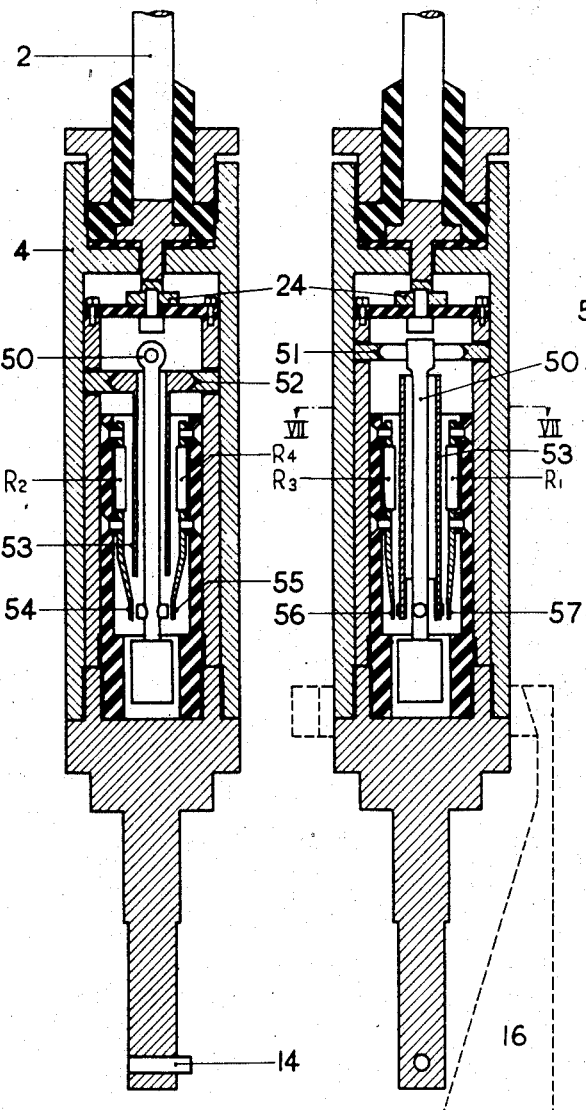
Fig. 5 is a longitudinal cross-section view of an embodiment of the present orienting device wherein a pendulum is used as the movable member.
Fig. 6 is a longitudinal cross-section view taken at right angles to Fig. 4.
Figure 7:
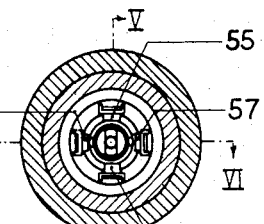
Fig. 7 is a cross-section view taken along line VII—VII of Fig. 6.
Figure 8:
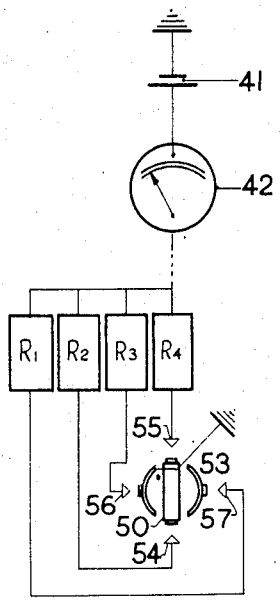
Fig. 8 is a wiring diagram of the electrical circuit used in operating the device of Figs. 5 and 6.

The device of Figs. 5 and 6 is quite similar in construction to that of Fig. 1, except that the free rolling ball 30 is replaced by a pendulum having elements 50 and 53, mounted within the housing 4 by means of shafts 51 and 52, arranged at right angles to each other and to the axis of the apparatus. The main pendulum element 50 is encompassed by the auxiliary pendulum element 53, which is of tubular construction. The main pendulum oscillates between a pair of contacts 54 and 55, shown in Fig. 5, while the auxiliary pendulum oscillates between contacts 56 and 57 shown in Fig. 6. Each of said contacts is connected through one of the resistors $R_1$, $R_2$, $R_3$ and $R_4$, having different resistance values, and through suitably insulated conductors (not shown in the drawings) to the contact plate 24, which is electrically connected by means of cable 2 to the ammeter 42, the source of E. M. F. 41 and the ground, as shown in Fig. 8.

The device of Figs. 5 and 6 is operated in the same manner as that of Fig. 1. For example, the housing 4 is adjusted by means of the pin 14 so as to bring the horizontal axial line of pivot 51 to lie in the plane of symmetry of the whipstock, the body of the whipstock lying to the right of the vertical axis of the apparatus, as shown in dotted lines in Fig. 6.

The drill bit, whipstock and orienting device are then lowered into the borehole and rotated therein until the deviation plane of the well is made to coincide with the symmetry plane of the whipstock, which is also the plane of the axis of pivot 51. When this condition is reached, the main pendulum 50 assumes the same position as when the instrument is in a perfectly vertical position, that is, has no tendency to deflect to either side, and the contacts 54 and 55 remain open. The auxiliary pendulum 53, whose pivotal axis 52 is at right angles to that of the main pendulum, will then swing by gravity towards that side of the longitudinal axis of the apparatus which is away from the earth's surface. If, with the body of the whipstock placed as stated above, it is desired to straighten a deflecting borehole, and the reading of the indicating device 42 shows that contact 56, connected to the resistance $R_2$, is closed, the whipstock is in correct position. If contact 57 is closed, the whipstock is 180° off its correct position, which may then be rectified by rotating it through said angle.

It is understood that instead of two pendulums 50 and 53 supported by pivots 51 and 52, a single pendulum supported by a universal joint and carrying four contacts corresponding to contacts 54, 55, 56 and 57 may be used to obtain the same results.

It is also understood that the present device may be operated with either direct or alternating current, and that besides ordinary resistance phenomena, as exemplified by the use of resistors $R_{1-4}$, any other electric phenomena, such as inductance, capacitance, thermoelectric effects, etc., may be utilized in transmitting to the surface indications as to the position of the present orienting device within the borehole.

We claim as our invention:

1. In an apparatus for deflecting boreholes deviating from the vertical, a tubing string adapted to be lowered into a borehole, a drill bit attached to the lower end of the string, a whipstock, frangible means detachably affixing said whipstock to the lower end of the string, a clinometer carried by the lower end of the string, said clinometer being adapted to indicate the angular relationship between the whipstock and the deviation plane of the borehole, means for electrically transmitting said indications to the surface, means for setting the whipstock according to the indications of the clinometer, and means for guiding the drill bit past the whipstock by applying to the string a downward pressure sufficient to break the frangible means affixing the whipstock to the string, whereby the borehole is deflected in the desired direction by continued drilling.

2. In an apparatus for deflecting boreholes deviating from the vertical, a tubing string adapted to be lowered into a borehole, a drill bit attached to the lower end of the string, a whipstock, frangible means detachably affixing said whipstock to the lower end of the string, a clinometer housing carried within the lower end of the string in known angular relationship to said whipstock, a plurality of mutually insulated electrical contacts within the housing, an indicating device at the surface, means electrically connecting said device to each of said contacts, said means comprising resistances arranged to give the current passing through each of said contacts a different value from the current passing through any other contact, a free rolling ball within the housing adapted to close an electric circuit comprising the indicating device and at least one of said contacts when the borehole deviates from the vertical, said ball tending to assume by gravity its lowermost position within the clinometer housing, means for setting the whipstock according to the indications of the indicating device, and means for guiding the drill bit past the whipstock by applying to the string a downward pressure sufficient to break the frangible means affixing the whipstock to the string, whereby the borehole is deflected in the desired direction by continued drilling.

3. In an apparatus for deflecting boreholes deviating from the vertical, a tubing string adapted to be lowered into a borehole, a drill bit attached to the lower end of the string, a whipstock, frangible means detachably affixing said whipstock to the lower end of the string, a clinometer housing carried within the lower end of the string in known angular relationship to said whipstock, a plurality of mutually insulated electrical contacts within the housing, an indicating device at the surface, means electrically connecting said device to each of said contacts, means adapted to give the current passing through each of said contacts electrical characteristics different from those of the current passing through any other contact, a free rolling ball within the housing adapted to close an electric circuit comprising the indicating device and at least one of said contacts when the borehole deviates from the vertical, said ball tending to assume by gravity its lowermost position within the clinometer housing, liquid passages for circulating a drilling fluid down the string past the clinometer housing to the space outside the drill bit, means for setting the whipstock according to the indications of the indicating device, and means for guiding the drill bit past the whipstock by applying to the string a downward pressure sufficient to break the frangible means affixing the whipstock to the string, whereby the borehole is deflected in the desired direction by continued drilling.

ALPHONS GERARD HUBERT STRAATMAN.
DOUGLAS PERCY REES.